(12) United States Patent  (10) Patent No.: US 9,152,206 B2
Homchaudhuri et al.  (45) Date of Patent: Oct. 6, 2015

(54) SYSTEM AND METHOD FOR REDUCING POWER CONSUMPTION

(71) Applicant: QUALCOMM Incorporated, San Diego, CA (US)

(72) Inventors: Sandip Homchaudhuri, San Jose, CA (US); James Simon Cho, Mountain View, CA (US); Paul Husted, San Jose, CA (US); Sarvesh Shrivastava, Sunnyvale, CA (US)

(73) Assignee: Qualcomm Incorporated, San Diego, CA (US)

(*) Notice: Subject to any disclaimer, the term of this patent is extended or adjusted under 35 U.S.C. 154(b) by 129 days.

(21) Appl. No.: 13/922,159

(22) Filed: Jun. 19, 2013

(65) Prior Publication Data

US 2014/0208138 A1 Jul. 24, 2014

Related U.S. Application Data

(60) Provisional application No. 61/756,422, filed on Jan. 24, 2013.

(51) Int. Cl.
*H04M 1/00* (2006.01)
*G06F 1/32* (2006.01)
*H04W 52/00* (2009.01)

(52) U.S. Cl.
CPC ............ *G06F 1/3209* (2013.01); *G06F 1/3225* (2013.01); *G06F 1/3278* (2013.01); *H04W 52/00* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,564,810 B2 | 7/2009 | Hernandez et al. | |
| 7,734,938 B2 | 6/2010 | Kim | |
| 8,422,419 B2 | 4/2013 | Kim et al. | |
| 8,583,190 B1 * | 11/2013 | Kopikare et al. | 455/574 |
| 2006/0013159 A2 | 1/2006 | Gurevich | |
| 2006/0129703 A1 | 6/2006 | Oshikawa et al. | |
| 2006/0156383 A1 * | 7/2006 | Waris | 726/1 |
| 2007/0004374 A1 * | 1/2007 | Kneckt | 455/343.1 |
| 2008/0291881 A1 | 11/2008 | Vranken et al. | |
| 2012/0178491 A1 * | 7/2012 | Tsai | 455/517 |
| 2012/0236837 A1 | 9/2012 | Stacey | |
| 2013/0009932 A1 | 1/2013 | Choi et al. | |
| 2013/0067260 A1 | 3/2013 | Gatta et al. | |
| 2013/0070701 A1 | 3/2013 | Merlin et al. | |
| 2013/0343250 A1 * | 12/2013 | Homchaudhuri et al. | 370/311 |

* cited by examiner

*Primary Examiner* — Suhail Khan
(74) *Attorney, Agent, or Firm* — Bay Area Technology Law Group PC

(57) ABSTRACT

Systems and methods are disclosed for operating an interface of an electronic device in an active mode or a power save mode based, at least in part, on a condition of a data exchange module buffer. When buffer space is available, incoming data may be stored locally and the interface used to access remote memory storage may be in a power save mode. The interface may revert to active mode to transfer data to the remote memory, such as after a configurable reception interval. Outgoing data may also be stored in a buffer, allowing the interface to be in a power save mode with information transmitted from the buffer.

44 Claims, 9 Drawing Sheets

SYSTEM AND METHOD FOR REDUCING POWER CONSUMPTION

RELATED APPLICATIONS

The present application claims priority of U.S. Provisional Patent Application Ser. No. 61/756,422, filed Jan. 24, 2013.

FIELD OF THE PRESENT DISCLOSURE

This disclosure generally relates to interfaces used to exchange data between various components of an electronic device and more specifically to systems and methods for reducing power consumption by dynamically switching between interface power modes.

BACKGROUND

An ongoing trend in the design of modern electronics equipment is the drive to increase the power efficiency of the devices. Particularly with mobile devices or other battery-powered devices, greater power efficiency is almost a universally desirable attribute. To that end, various types of power saving mechanisms are often employed. For example, considerable emphasis may be placed on managing power states associated with the operation of various functional components or modules of the device. However, the power consumed by an interface used to couple such components may also represent an area where efficiencies may be realized.

In one aspect, many electronic devices employ an interface to provide interconnections between a host processor, memory, and one or more functional elements. As such, power efficiency may be increased when the interface offers one or more power saving modes. In most instances, operating one or more aspects of an electronic device in a reduced power mode comes at the expense of reduction in functionality. When returning to normal operation, a period of time is required for reactivation. This latency is typically proportional to the reduction in power consumed. For example, a power saving mode involving clock gating may have a wake up time on the order of tens of nanoseconds and result in a modest reduction in power. As another example, a power saving mode that deactivates phase locked loop (PLL) circuits may represent a greater power saving but require a wake up time on the order to tens of microseconds. Accordingly, it would be desirable to increase the amount of time the interface operates in a power saving mode without incurring a corresponding reduction in performance of the electronic device. This disclosure satisfies this and other goals.

SUMMARY

This specification discloses systems including a wireless communications device having a transceiver, an interface, local memory coupled to the transceiver, remote memory coupled to the transceiver through the interface, and a link manager, wherein the link manager may switch the interface between an active mode and a power save mode based, at least in part, on a buffer condition of the transceiver and a state of the transceiver.

In one aspect, the transceiver may include a receive buffer implemented in the local memory and the link manager may operate the interface in the power save mode when data in the receive buffer is below a high watermark and may switch the interface to the active mode when data in the receive buffer is above the high watermark. Further, the link manager may switch the interface from the power save mode to the active mode when a reception interval lapses. The link manager may also switch the interface from the power save mode to the active mode when the reception interval lapses while receiving data having a first traffic class.

In one aspect, the link manager may transfer data from the receive buffer to the remote memory when switching the interface from the power save mode to the active mode prior to data in the receive buffer being above the high watermark.

In another aspect, the link manager may switch the interface from the active mode to the power save mode when data in the receive buffer falls below a low watermark.

In yet another aspect, the link manager may operate the interface in the power save mode when data in the receive buffer is below the high watermark if data is queued for transmission while the transceiver is actively receiving. Further, the link manager may determine a period of time corresponding to when the transceiver is actively receiving and coordinate a switch from the power save mode to the active mode based, at least in part, on the period of time.

In one aspect, the transceiver may include a transmit buffer implemented in the local memory and the link manager may operate the interface in the active mode when data in the transmit buffer is below a high watermark and switch the interface to the power save mode when data in the transmit buffer is above the high watermark. Further, the link manager may switch the interface from the power save mode to the active mode when data in the transmit buffer falls below a low watermark and start filling up the buffer again up to the high watermark for the next transmission. Additionally, the link manager may estimate a period of time required to transmit data in the transmit buffer and switch the interface from the power save mode to the active mode based, at least in part, on the period of time. The link manager may estimate the period of time based, at least in part, on a transmit data rate, transmission bandwidth, number of antenna chains transmitted on and/or recent channel metrics.

In another aspect, the link manager may operate the interface in the power save mode for at least a portion of a back off period after the information is queued for transmission.

In yet another aspect, the link manager may switch between the active mode and the power save mode based, at least in part, on an analysis of recent traffic.

This disclosure also includes methods for operating a wireless communications device. For example, the wireless communications device may include a transceiver, an interface, local memory coupled to the transceiver and remote memory coupled to the transceiver through the interface, and the method may include switching the interface between an active mode and a power save mode based, at least in part, on a buffer condition of the transceiver and a state of the transceiver. The transceiver may include a receive buffer implemented in the local memory, such that the interface may be operated in the power save mode when data in the receive buffer is below a high watermark and the interface may be switched to the active mode when data in the receive buffer is above the high watermark.

In one aspect, the interface may be switched from the power save mode to the active mode when a reception interval lapses, such as while receiving data having a first traffic class.

In another aspect, data may be transferred from the receive buffer to the remote memory when switching the interface from the power save mode to the active mode prior to data in the receive buffer being above the high watermark.

In yet another aspect, the interface may be switched from the active mode to the power save mode when data in the receive buffer falls below a low watermark.

Still further, the interface may be operated in the power save mode data is queued for transmission while the transceiver is actively receiving and the data in the receive buffer is below the high watermark. In addition, a period of time corresponding to when the transceiver is actively receiving may be determined and a switch from the power save mode to the active mode may be coordinated based, at least in part, on the period of time.

In one aspect, the transceiver may include a transmit buffer implemented in the local memory such that the interface may be operated in the active mode when data in the transmit buffer is below a high watermark and the interface may be switched to the power save mode when data in the transmit buffer is above the high watermark. Further, the interface may be switched from the power save mode to the active mode when data in the transmit buffer falls below a low watermark so as to facilitate storing of data, for the next transmission, into the buffer. Additionally, a period of time required to transmit data in the transmit buffer may be estimated and the interface may be switched from the power save mode to the active mode based, at least in part, on the period of time. Still further, the period of time may be estimated based, at least in part, on a transmit data rate, transmission bandwidth, number of antenna chains transmitted on and/or on recent channel metrics.

In another aspect, the interface may be operated in the power save mode for at least a portion of a back off period if information is queued for transmission.

In yet another aspect, the method may include switching between the active mode and the power save mode based, at least in part, on an analysis of recent traffic or thrashing tolerance between active and low-power states of the interface.

This disclosure also includes a non-transitory processor-readable storage medium for operating a wireless communications device, wherein the wireless communications device includes a transceiver, an interface, a local memory available to the transceiver, wherein the local memory is not communicably coupled to the transceiver through the interface, a remote memory communicably coupled to the transceiver through the interface, and a buffer implemented in the local memory, the processor-readable storage medium having instructions thereon, when executed by a processor to cause the wireless communications device to operate the interface in at least an active mode and a power save mode based, at least in part, on a condition of the buffer and a state of the transceiver.

In one aspect, the buffer may be a receive buffer, such that the instructions to operate the interface include instructions to operate the interface in the power save mode when data in the receive buffer is below a high watermark and to operate the interface in the active mode when data in the receive buffer is above the high threshold. The storage medium may have further instructions to cause the wireless communications device to transfer data from the receive buffer to the remote memory when switching the interface from the power save mode to the active mode prior to data in the receive buffer being above the high watermark. The instructions to operate the interface may include instructions to switch the interface from the active mode to the power save mode when data in the receive buffer falls below a programmable low watermark. Still further, the storage medium may include instructions to operate the interface in the power save mode when data is queued for transmission while the transceiver is actively receiving and data in the receive buffer is below the high watermark.

In one aspect, the storage medium may include instructions to determine a period of time corresponding to when the transceiver is actively receiving and to coordinate a switch from the power save mode to the active mode based, at least in part, on the period of time in preparation for transmission of the queued data.

In one aspect, the buffer may be a transmit buffer, such that the instructions for operating the interface may include instructions to operate the interface in the active mode when data in the transmit buffer is below a high watermark and operating the interface in the power save mode when data in the transmit buffer is above the high watermark. The storage medium may also include instructions to transmit data from the transmit buffer when the interface is in power save mode and the data in the transmit buffer is above the high watermark. The instructions to operate the interface may include instructions to switch the interface from the power save mode to the active mode when data in the transmit buffer falls below a low watermark. Further, the storage medium may include instructions to estimate a period of time required to transmit data in the transmit buffer, wherein the instructions to operate the interface comprise instructions to switch the interface from the power save mode to the active mode based, at least in part, on the period of time. In addition, the instructions to estimate the period of time may include instructions to estimate the period of time based, at least in part, on a transmit data rate and may also be based, at least in part, on recent channel metrics.

In one aspect, the storage medium may also include instructions to operate the interface in the power save mode for at least a portion of a back off period when information is queued for transmission.

In one aspect, the storage medium may also include instructions to maintain an operational state of the interface if a number of switches between the active mode and the power save mode by the interface over a defined period of time is above a predetermined threshold.

BRIEF DESCRIPTION OF THE DRAWINGS

Further features and advantages will become apparent from the following and more particular description of exemplary embodiments of the disclosure, as illustrated in the accompanying drawings, and in which like referenced characters generally refer to the same parts or elements throughout the views, and in which.

DETAILED DESCRIPTION

Figure 1:
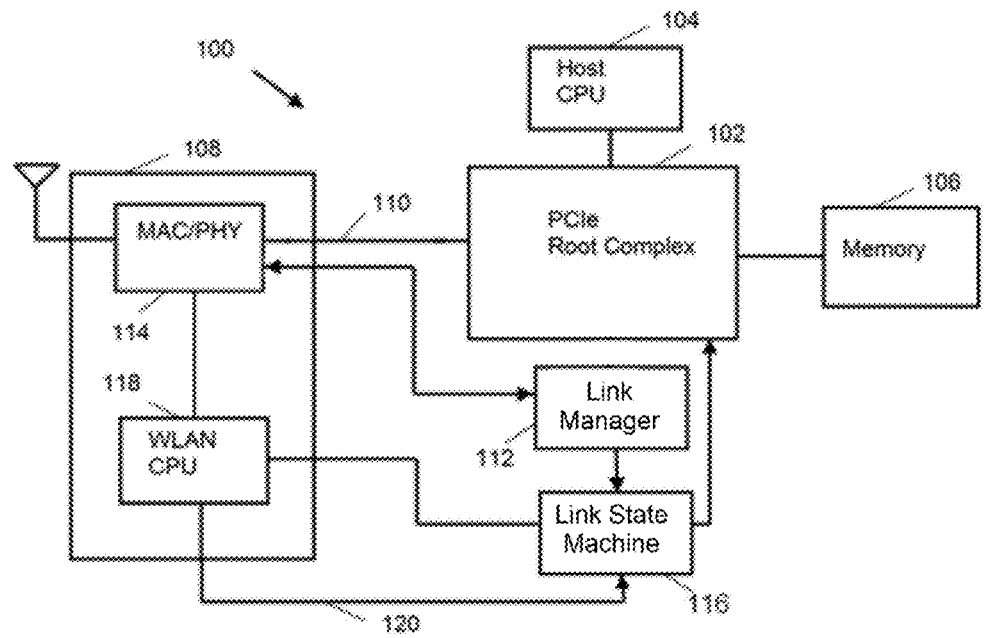
FIG. 1 depicts a schematic representation of functional blocks of a wireless communications device, according to one embodiment.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, exemplary materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the disclosure in any manner and may change depending upon context. Further, sequential terms such as first and second may be used to distinguish similar elements, but may be used in other orders or may change also depending upon context.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

The techniques of this disclosure include dynamically switching the power state of an interface in an electronic device based, at least in part, on a condition of the local memory available to a data exchange module, such as available space in a receive or transmit buffer, and a state of the data exchange module. In the embodiments discussed below, the electronic device is a wireless communications device described in the context of a wireless local area network (WLAN) system, such as one conforming to the Institute of Electrical and Electronics Engineers (IEEE) 802.11 standards, although other wireless communications protocols may also be employed. As such, a representative example of a data exchange module according to the techniques of this disclosure may be a wireless transceiver. However, these techniques may be applied to any electronic device having a data exchange module coupled to other elements of the electronic device through an interface. Other suitable examples of a data exchange module include a storage device (e.g., a disk drive or solid state drive), a graphics card, a wired networking interface, or any other component having local memory that transmits and/or receives data over an interface capable of operating in multiple power states. Further, the interface employed by the electronic device in the following examples is a peripheral component interconnect express (PCIe) interface, but the techniques may be employed to any other suitable interface.

PCIe is a serial interconnect technology, promoted by the PCI-SIG (Special Interest Group). PCIe technology is a low cost, highly scalable, switched, point-to-point, serial I/O interconnect involving a layered architecture including at least a transaction layer, a data link layer and a physical (PHY) layer. The transaction layer is responsible for transporting read/write requests from software to the I/O devices. The data link layer is primarily responsible for ensuring reliable delivery of packets across the PCIe link. The PHY layer handles the low level PCIe protocol and signaling. The PHY layer consists of a dual simplex channel implemented as a transmit and a receive pair. The combination of a transmit and receive pair are commonly referred to as a lane. The current standard, PCI Express 3.0, uses a 128 b/130 b encoding scheme and an 8 GT/s bit rate to provide a bandwidth capacity of 1 GB/s per lane.

Various link states are identified in the PCIe specification for power management of devices. The link states represent a decreasing amount of power consumption that comes at the expense of an increasing latency in returning to the fully functional state. The L0 state is the fully operational power state with full power on and all clocks running. The first level of power saving is represented by the L0s state. A chief characteristic of the L0s state is a very low exit latency, allowing the use of the L0s state to reduce power consumption during short intervals of logical idle between link activities. The specified wake-up to the L0 state from the L0s state is less than 10 ns. In this logical idle state, the receiver can maintain the clock signal and symbol synchronization associated with the link because the transceiver continues to send idle symbols, which do not contain data and may be discarded by the receiver.

The next level of power reduction is represented by the L1 state, which offers greater degree of power saving at the expense of some increase in the latency required to wake up to the L0 state. The L1 state may be enabled to reduce power when the link has a lack of outstanding requests or pending transactions. The specified wake-up for L1 state is less than 5 µs. In the L1 state, the device is in an electrical idle state, such that no differential voltage is applied to the link and no signaling occurs. Thus, in the L1 state, the device loses synchronization with the link clock and may employ a clock data recovery (CDR) circuit to reestablish synchronization when transitioning to an active state. Further, the device may optionally power off its internal clock circuit.

To provide additional degrees of control over the power consumed by the PCIe interface, two additional sub-states of the L1 state are specified. While operating in the L1.1 sub-state, additional analog circuits in the PHY layer are deactivated with a latency of less than approximately 25 µs. In the L1.2 sub-state, the common-mode voltage is also powered off and is associated with a latency of less than approximately 75 µs.

Finally, the L2 (sleep) and L3 (powered-off) states are the least power consuming states with power and clocks shut down. As the link moves from the L0 state towards an L2/L3 state, more power saving may be achieved, but the exit latency for transitioning from these states to the L0 state may increase.

To help illustrate aspects of this disclosure, FIG. 1 schematically depicts functional blocks of a wireless communications device 100 in which PCIe root complex 102 forms the basis of an input and output hierarchy coupling various elements of the device directly or indirectly. Root complex 102 provides connection to host CPU 104, remote memory 106 and endpoints such as a data exchange module, WLAN module 108, over the interface, PCIe link 110. Device 100 also includes power module 112 operating as a centralized block for coordinating power save modes of the various functional blocks of device 100, including WLAN module 108, host CPU 104 and root complex 102. Link manager 112 communicates with media access control (MAC) and PHY layers 114 of WLAN module 108 to track the state of receive and transmit buffers in WLAN module 108 and other local memory locations. As shown, link manager 112 interacts with link state machine 116 to configure the power saving state of the PCIe interface. For example, link state machine 116 may include message, configuration and request registers that are accessed by root complex 102 and WLAN CPU 118.

In one aspect, link manager 112 and link state machine 116 may coordinate to establish a power saving state for PCIE Root Complex 102. For example, based, at least in part, on information regarding transmit and receive buffers obtained by link manager 112, link state machine 116 may operate the PCIe interface in an L0 or in an L1.2 sub-state. Link state machine 116 may be configured to operate the PCIe interface in other power saving states as desired. Link manager 112 may be implemented in hardware, software or a combination. Depending upon the implementation, link manager 112 may signal link state machine 116 to transition between link states using hardware or software interrupts, as desired.

Figure 2:
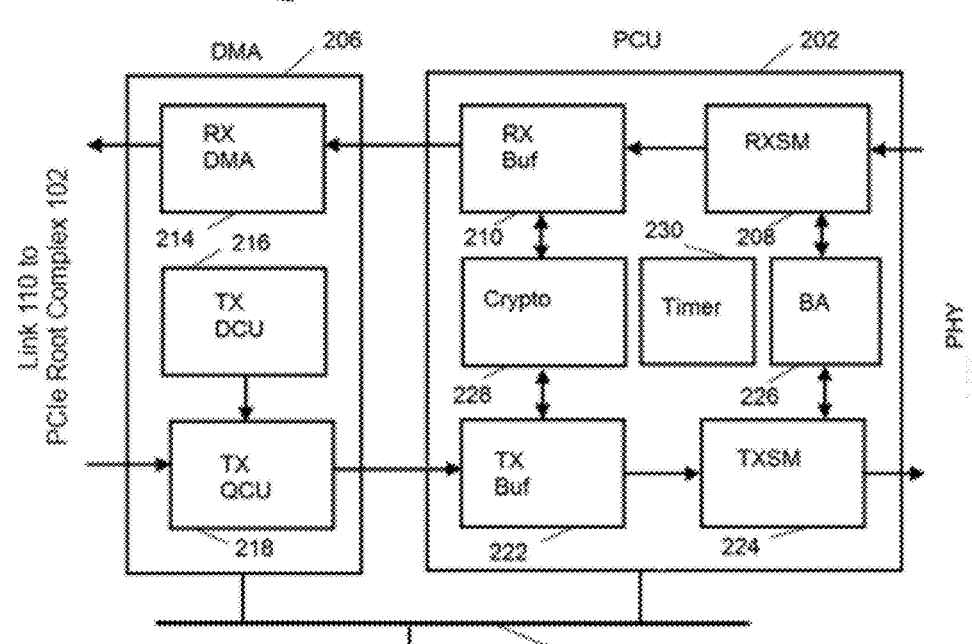
FIG. 2 is a more detailed schematic of the media access control layer of the wireless communication device shown in FIG. 1.

A more detailed schematic of the functional components of the MAC architecture 200 of MAC/PHY layers 114 is shown in FIG. 2. As can be seen, MAC architecture 200 includes protocol control unit (PCU) block 202 coupled to the PHY layer and direct memory access (DMA) block 206 which is coupled to the root complex over the interface. Generally, a receive chain as implemented in MAC architecture 200 may include receive state machine (RXSM) 208 coupled to receive buffer (RX Buf) 210 that outputs to receive DMA (RX DMA) 214 which then outputs to the interface. Likewise, a transmit chain may include transmit distributed coordination function control unit (TX DCU) 216 feeding transmit queue control (TX QCU) 218 which then outputs to transmit buffer (TX Buf) 222. TX Buf 222 in turn feeds transmit state machine (TXSM) 224 which communicates to the PHY layer. PCU block 202 may also include block acknowledgment unit (BA) 226 that interfaces with both RXSM 208 and TXSM 224. Encryption unit (CRYPTO) 228 may be coupled to RX Buf 210 and TX Buf 222 to provide WEP, WPA, WPA2 or other suitable encryption mechanism. Timer 230 coordinates operations of PCU block 202. PCU block 202 and DMA block 206 may also be coupled to a suitable bus 232 as desired. In one embodiment, MAC architecture 200 may be implemented in an ARM-based system and be overlaid upon an advanced microcontroller bus architecture (AMBA) fabric, such as an Advanced eXtensible Interface (AXI) or an Advanced Peripheral Bus (APB) as desired.

During operation, WLAN module 108 may have access to multiple classes of memory. Local memory, such as RX BUF 210 and TX BUF 222, may be accessed directly by the MAC RXSM 208 and MAC TXSM 224 for temporary storage before the DMA engine transports it out of the MAC system into remote memory 106 on the host subsystem via PCIe link 110. Local memories may be kept small in size to reduce the overall area and power footprint of the MAC system. As such, operations involving local memory may be performed regardless of the link state of the PCIe interface. WLAN module 108 may also access remote memory 106 over PCIe link 110. However, this requires the PCIe interface to be in the L0 link state.

According to the techniques of this disclosure, PCIe link 110 may be dynamically switched to a power saving mode, such as link state L1.2, when local memory resources allow uninterrupted operation of WLAN module 108. In one embodiment, the size of RX BUF 210 and TX BUF 222 may be increased to facilitate this aspect. However, due to design constraints or other considerations, the amount of memory available in MAC/PHY 114 may be limited. Since it may be desirable to increase the amount of local memory available to WLAN module 108, additional local memory may be provided from any suitable on-chip source.

Figure 3:
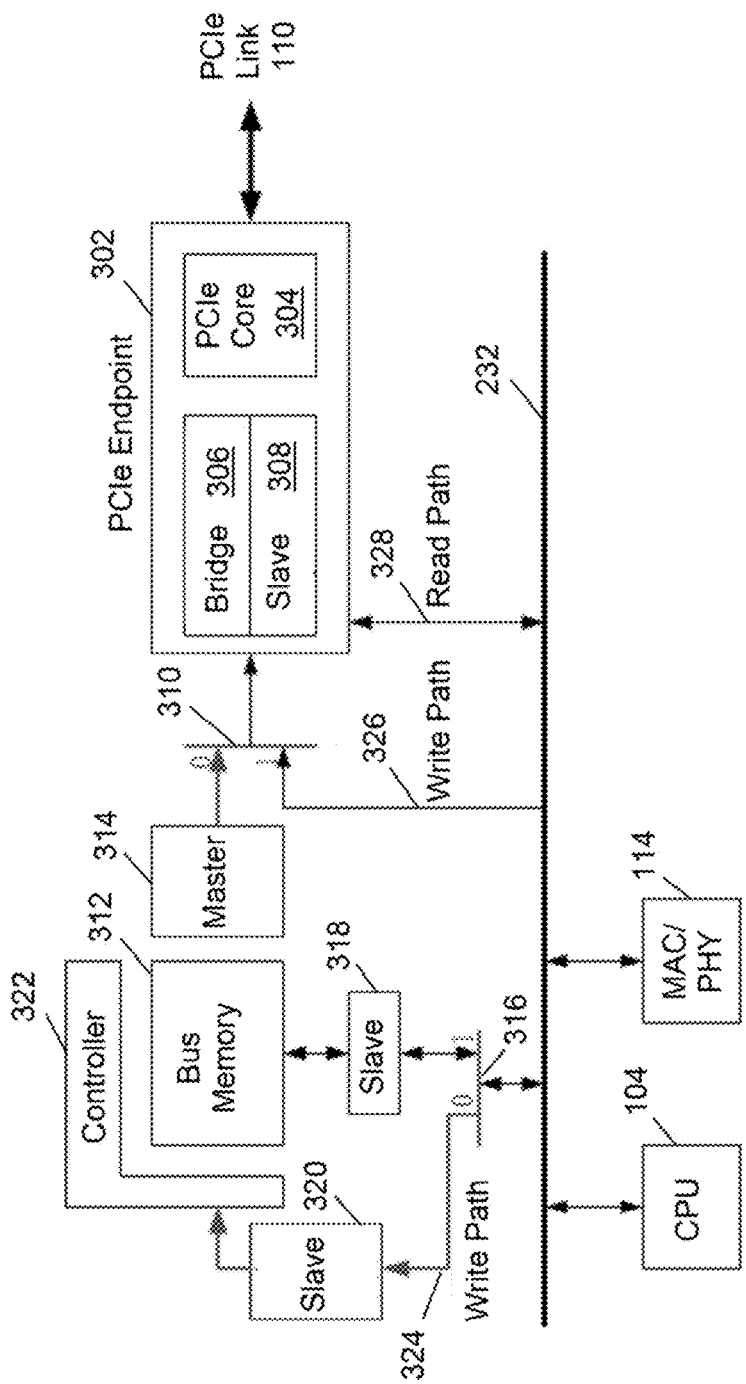
FIG. 3 schematically depicts data flow across a bus in a wireless communications device, according to one embodiment.

For example, in the embodiment shown in FIG. 3, WLAN module 108 may utilize memory associated with bus 232. Since bus 232 may represent an on-chip interconnect, WLAN module 108 may access this memory without involvement of the PCIe interface. FIG. 3 schematically shows data flow over bus 232 and the connection with the PCIe interface. PCIe link 110 is coupled to PCIe endpoint 302, including PCIe core 304, including the transaction layer, the data link layer and the PHY layer. Information and signaling messages are translated to the appropriate protocol and format by bridge 306 and coupled to bus 232 by bus slave 308. Multiplexer 310 may couple either bus 232 or bus memory 312 to PCIe endpoint 302 through master 314. Likewise, multiplexer 316 may couple bus 232 to bus memory 312 either through slave 318 or through slave 320 and controller 322. Controller 322, in one embodiment, performs the logic of automatic buffer flush upon various low/high watermark triggers or other thresholds as described below. Multiplexers 310 and 316 may be configured to switch bus memory 312 into and out of a write path between MAC/PHY 114 and PCIe endpoint 302, depending upon the link state of PCIe link 110. As shown, in the '0' condition, write path 324 may be formed from MAC/PHY 114 over bus 232, through slave 320 and controller 322 to bus memory 312. Controller 322 may manage writes to bus memory 312 using a first in, first out (FIFO) scheme or any other desired scheduling mechanism. Alternatively, in the depicted '1' condition, write path 326 may be formed from MAC/PHY 114 over bus 232 directly to PCIe endpoint 302. Bus memory 312 may communicate through slave 318 with CPU 104 in the '1' condition. MAC/PHY 114 may write to bus memory 312. Correspondingly, when PCIe link 110 is in the L0 state, MAC/PHY 114 may use write path 326 to access remote memory 106 through PCIe endpoint 302. Read path 328 may connect MAC/PHY 114 and PCIe endpoint 302.

In one embodiment, bus memory 312 may be configured as single port memory. Such designs may be associated with less complexity and reduced gate requirements, but may be limited in bandwidth and require higher power consumption. Alternatively, bus memory 312 may be configured as dual port memory to allow simultaneous read and write operations. Bandwidth may be increased with a tradeoff of an increased transistor count. A suitable memory design may be chosen based on desired performance characteristics.

For the purposes of this disclosure, the term "local memory" may include RX BUF 210, TX BUF 222, bus memory 312, or any other suitable memory co-located with WLAN module 108 that does not require access over the PCIe interface and the term "remote memory" may include remote memory 106 or any other memory location accessed over the PCIe interface. Local memory and remote memory may be accessed using a data streaming technique such as direct memory access (DMA.) Although some principles of this disclosure are discussed in the context of handling entire packets for clarity, it should be recognized that only portions of packets, such as the MAC header, may be processed depending upon the context or packet identifiers (e.g., the packet identifiers may be used such that the identifiers simply locate the packet, which may remain stored in one location in memory). For example, packet identifiers may include fields defining specific portions of memory, and may include address pointers and data length values. Further, as desired, a packet may be defined by a plurality of identifiers that may identify independent portions of memory that may be concatenated to form a complete packet.

As noted above, when sufficient local memory is available, WLAN module 108 may perform certain receive and transmit operations that do not require transmission of information over the PCIe interface. In turn, the PCIe interface may remain or be switched to a power saving mode, providing an increase in energy efficiency.

Figure 4:
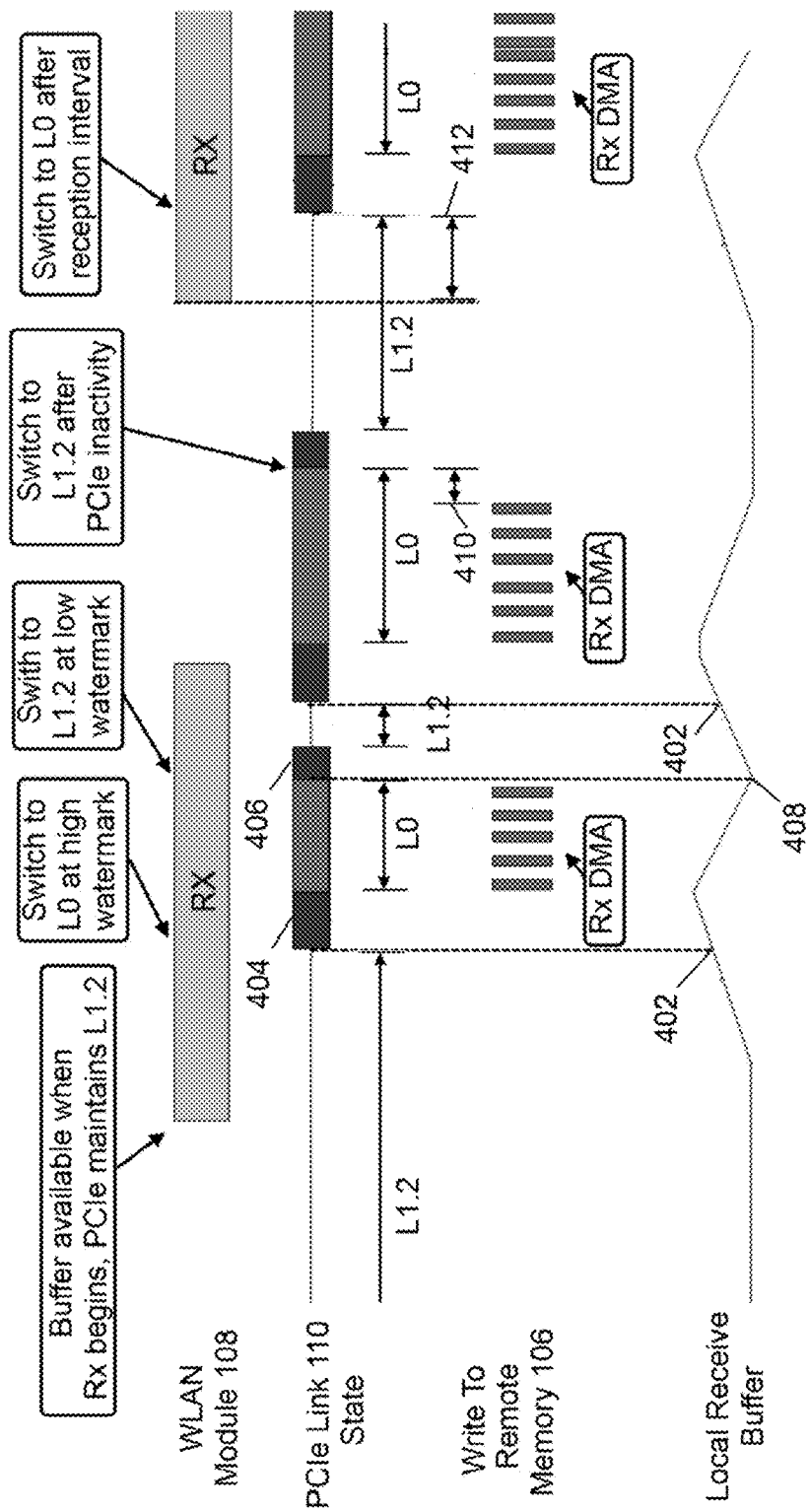
FIG. 4 schematically depicts dynamic switching of interface states based, at least in part, on available space in a receive buffer, according to one embodiment.

In one aspect, selection between PCIe link states may be predicated on a condition of a receive buffer implemented in local memory and a state of WLAN module 108, as schematically illustrated in FIG. 4. WLAN module 108 may be in a receiving mode, such that incoming packets are stored into the local memory receive buffer. When the local receive buffer is below a high watermark, or other suitable threshold, PCIe link 110 may be in a power saving mode, such as the L1.2 sub-state. When high watermark 402 is reached as determined by link manager 112, link state machine 116 may transition PCIe link 110 to the L0 state. In one embodiment, local memory receive buffer may provide approximately 200 to 300 μs of buffering.

The transition between states may be associated with a latency. For example, the transition from L1.2 to L0 may be associated with latency 404. Similarly, the transition from L0 to L1.2 may be associated with latency 406. Generally, the transition from a power saving mode to an active mode may require more time than the transition from an active mode to a power saving mode. Timing of link state switching, such as by adjusting high watermark 402, may be configured to accommodate the associated latency. Further, buffer sizes and watermarks may be configured based, at least in part, on latency 404 to help avoid buffer under runs or other negative performance results.

Upon entry to the L0 state, the local memory receive buffer may be flushed to remote memory 106 over PCIe link 110. As local memory receive buffer is emptied, it may reach low watermark 408, such that memory manger 112 signals link state machine 116 to transition back to the L1.2 sub-state. As packets may still be incoming, the local memory receive buffer may fill until it reaches high watermark 402 again, triggering another switch to L0 as indicated. In one embodiment, the low watermark may be set to zero, so that a switch to L1.2 may occur immediately when the local memory transmit buffer is emptied, without requiring an inactivity timer or any other parameter to help increase power efficiency.

The transition from L0 to L1.2 may also be triggered by PCIe activity. When the state of WLAN module 108 is such that it is no longer receiving packets, local memory receive buffer may transfer all stored incoming packets to remote memory 106 and there may be a period of inactivity on PCIe link 110. Accordingly, PCIe link 110 may return to L0 after a suitable timeout period 410. Depending upon the desired level of performance, the transition from L0 to L1.2 may be based, at least in part, on low watermark 408, timeout period 410 or any combination of these or similar factors.

In another aspect, PCIe link 110 may be transitioned from the L1.2 sub-state to the L0 state based, at least in part, on a state of WLAN module 108 with regard to the relative timing of incoming packets. For example, PCIe link 110 may transition to L0 after reception interval 412 that might start when local memory receive buffer begins filling. This approach may be employed to help ensure a desired quality of service (QoS) and therefore may be adjusted based, at least in part, on the traffic class of the incoming packets. For latency sensitive information, such as voice data or multimedia streaming, reception interval 412 may be configured with a relatively lower time period to minimize end-to-end application latency.

In yet another aspect, link manager 112 may be configured to flush local memory receive buffer upon any transition to the L0 state, regardless of the condition of the buffer. For example, when a packet is queued for transmission, the transmission header may be loaded into MAC/PHY 114. Since a read operation over the PCIe link 110 may be involved to retrieve the packet identified by the transmission header, the PCIe link 110 may be switch to the L0 state in preparation for the transmission. By draining the local memory receive buffer at this time even if the high watermark for the receive buffer is not reached, more space may be available during the next reception opportunity.

The techniques of this disclosure may also be based, at least in part, on a condition of the local memory transmit buffer. As noted above, conventional handling of a transmit packet may require a read operation over PCIe link 110. Given that many types of traffic may be bi-directional in nature, transitioning to L0 for every transmission may occur relatively frequently, undermining some of the benefits associated with allowing the interface to remain in a power saving mode only for reception. Accordingly, it may be desirable to accommodate certain transmission events without requiring a reversion to the L0 state.

Figure 5:
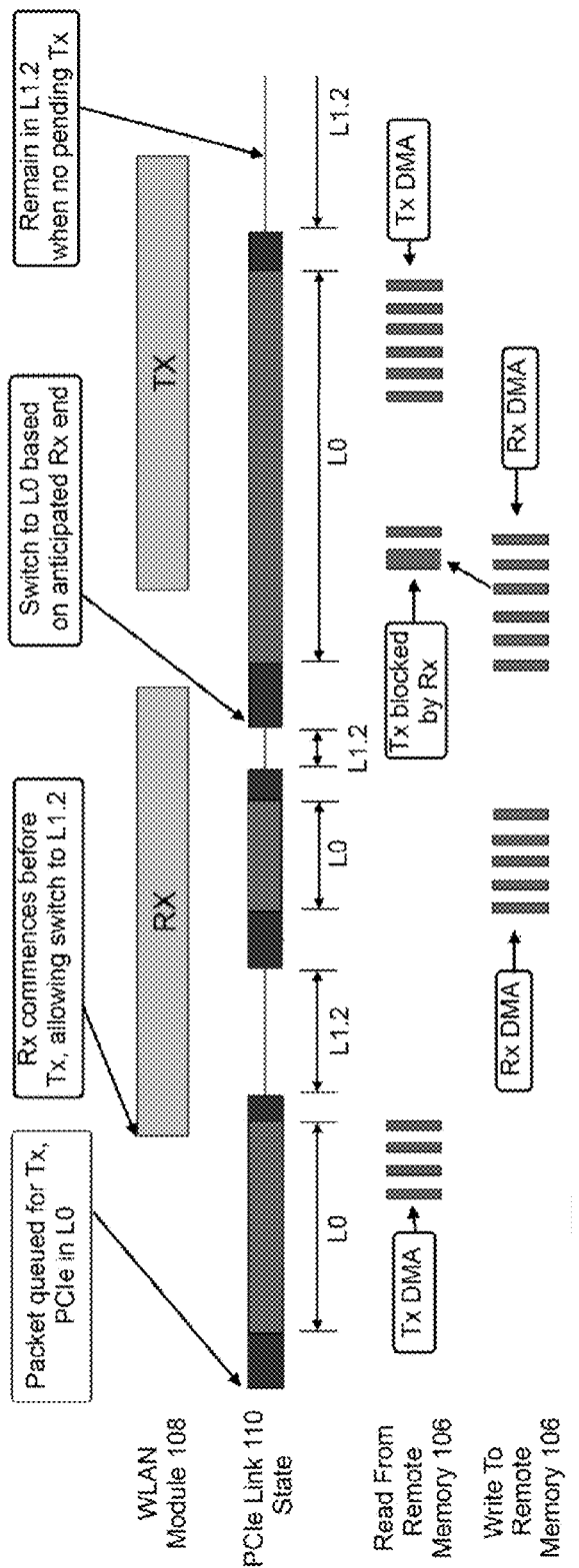
FIG. 5 schematically depicts dynamic switching of interface states based, at least in part, on the receive state of a wireless communications device, according to one embodiment.

In one aspect, a transition to L0 associated with pending transmission packets may be delayed based, at least in part, on a receive state of WLAN module 108. As shown in FIG. 5, PCIe link 110 may be in the L0 state in preparation for transmitting packets. To that end, MAC/PHY 114 may read some packet headers from remote memory 106. However, if WLAN module 108 begins to receive incoming packets before being granted a transmission opportunity, PCIe link 110 may transition to the L1.2 state in the manner described above, allowing the local memory receive buffer to store the incoming packets. Since WLAN Module 108 may not transmit during reception, switching between the L0 and L1.2 states may occur as warranted (e.g., based, at least in part, on the local memory receive buffer and the techniques described above). For example, PCIe link 110 may be placed in the L1.2 sub-state when adequate local memory receive buffer space is available even though a packet has been queued for transmission. After reception has finished, PCIe link 110 may switch to the L0 state as necessary to drain the local memory receive buffer and to read the packets for transmission. Further, link manager 112 may determine when reception will finish and cause link state machine 116 to transition PCIe link 110 to L0 in anticipation at least a configurable time before the actual expected transmission.

Figure 6:
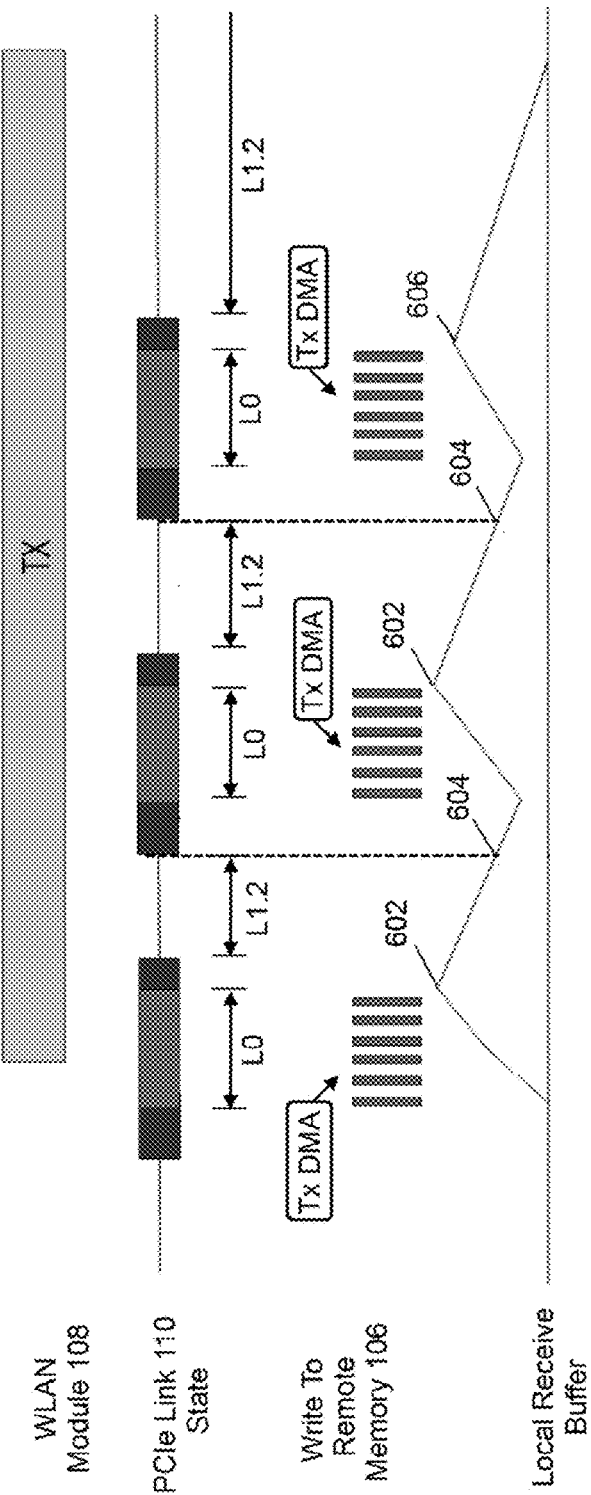
FIG. 6 schematically depicts dynamic switching of interface states based, at least in part, on available space in a transmit buffer, according to one embodiment.

In another aspect, selection between PCIe link states may be predicated on a condition of a transmit buffer implemented in local memory as schematically illustrated in FIG. 6. A state of WLAN module 108 may include having a pending transmission, such that packets to be transmitted are read from remote memory 106 and stored into the local memory transmit buffer. Local memory transmit buffer may be filled at a faster rate than packets are transmitted. Thus, when the local transmit buffer reaches full condition 602, PCIe link 110 may be taken to a power saving mode, such as the L1.2 sub-state. WLAN module 108 continues to transmit packets from local memory transmit buffer while PCIe link 110 is in the L1.2 sub-state, causing the buffer to drain. When low watermark 604 is reached as determined by link manager 112, link state machine 116 may transition PCIe link 110 to the L0 state to allow the buffer to refill. Once the last packet scheduled for transmission has been read from remote memory 106, as indicated by condition 606, PCIe link 110 may transition to the L1.2 state while the remaining packets are transmitted from the local memory transmit buffer. The PCIe interface may remain in this power saving mode until another trigger event occurs.

The amount of payload that is downloaded to the local memory transmit buffer may be configured based, at least in part, on the desired performance and the available local memory. In addition, an estimate of total transmission time may be determined based, at least in part, on the rate control adopted by the modulation and coding scheme (MCS), effective transmission bandwidth and the number of antenna chains transmitted upon, which can be more than or equal to 2, in a typical Multi-Input, Multi-Output (MIMO) system. From this estimate, corresponding intervals may be associated with available local memory and used to establish a suitable low watermark 604. Alternatively, the estimated time may be employed to revert to L0 after expiration of the time to ensure PCIe link 110 is in the L0 state to help avoid buffer under runs. Further, these estimations may include factors based, at least in part, on recent time-on-air statistics, clear channel assessments and other suitable metrics, like collision rate and retry rate.

Figure 7:
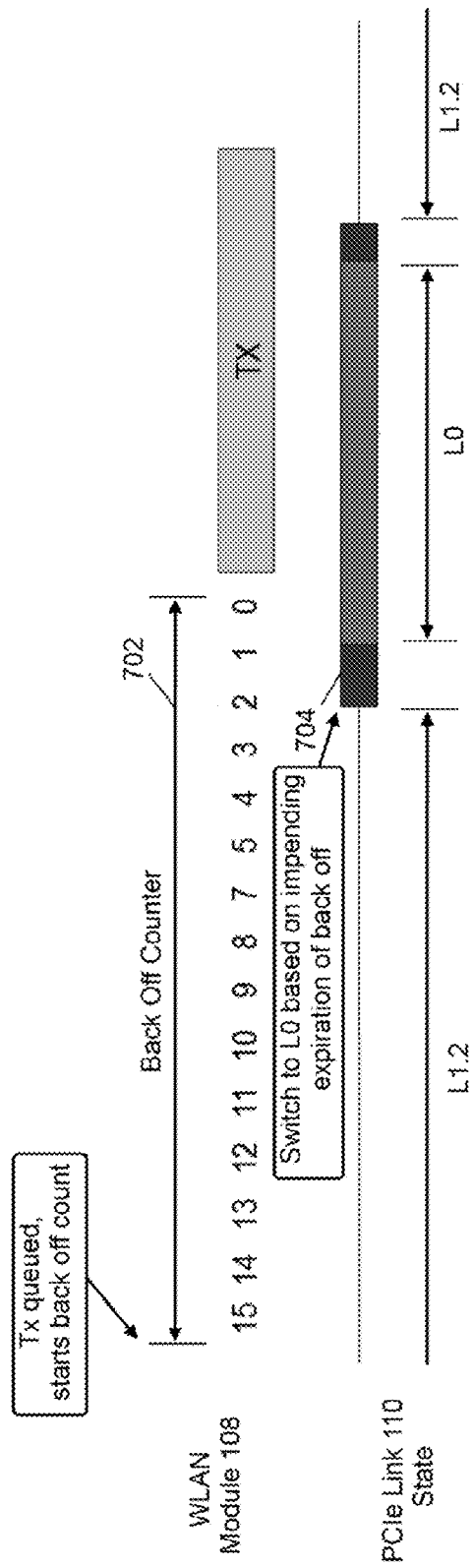
FIG. 7 schematically depicts dynamic switching of interface states based, at least in part, on a back off counter, according to one embodiment.

In yet another aspect, PCIe link 110 may be maintained in a power saving mode for a period of time corresponding to a state of WLAN module 108 as represented by a transmit opportunity back off counter. In a wireless communication system having media access arbitration, a wireless communications device may be granted a transmit opportunity after a back off period. For example, in a WLAN employing a carrier sense multiple access, collision avoidance (CSMA/CA) system, each transmit opportunity may be associated with a randomly determined back off period. Upon being granted access, WLAN module 108 may be required to wait for the back off period before transmitting. Accordingly, as shown in FIG. 7, WLAN module 108 may be granted a transmission opportunity and decrement a back off counter 702 prior to transmitting queued packets. PCIe link 110 may delay transition from the L1.2 sub-state to the L0 state during a portion of the back off period. Based, at least in part, on the latency 704 associated with the state transition, the switch to the L0 state may be initiated at a desired point of back off counter 702, such as approximately 2 or any other configurable number of slots before transmission. The decision of whether to maintain the L1.2 sub-state during the back off period may be based, at least in part, on the length of the back off period and may be adjusted depending on the performance desired.

In a further aspect, link manager 112 may employ an analytical system to assess incoming and outgoing data semantics to determine latency criticalities associated with a state of WLAN module 108. Link manager 112 may also be configured to monitor recent traffic patterns and adjust behavior accordingly. For example, if it is determined that too many state switches are being triggered over a given period of time, link manager 112 may be configured to adjust the appropriate parameters to reduce the rate of state switching, also referred to as "thrashing."

Figure 8:
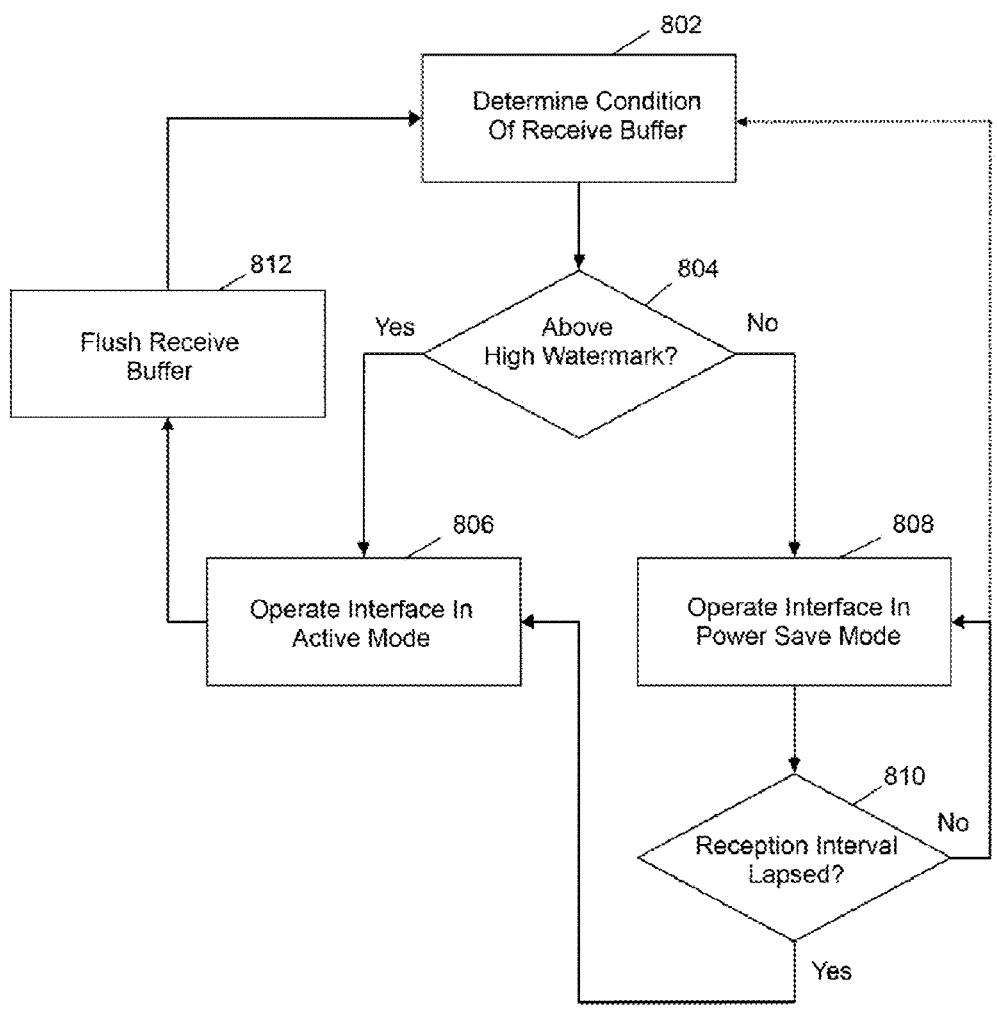
FIG. 8 is a flowchart representing a routine for controlling the link state of an interface using a receive buffer condition of a transceiver, according to one embodiment.
Figure 9:
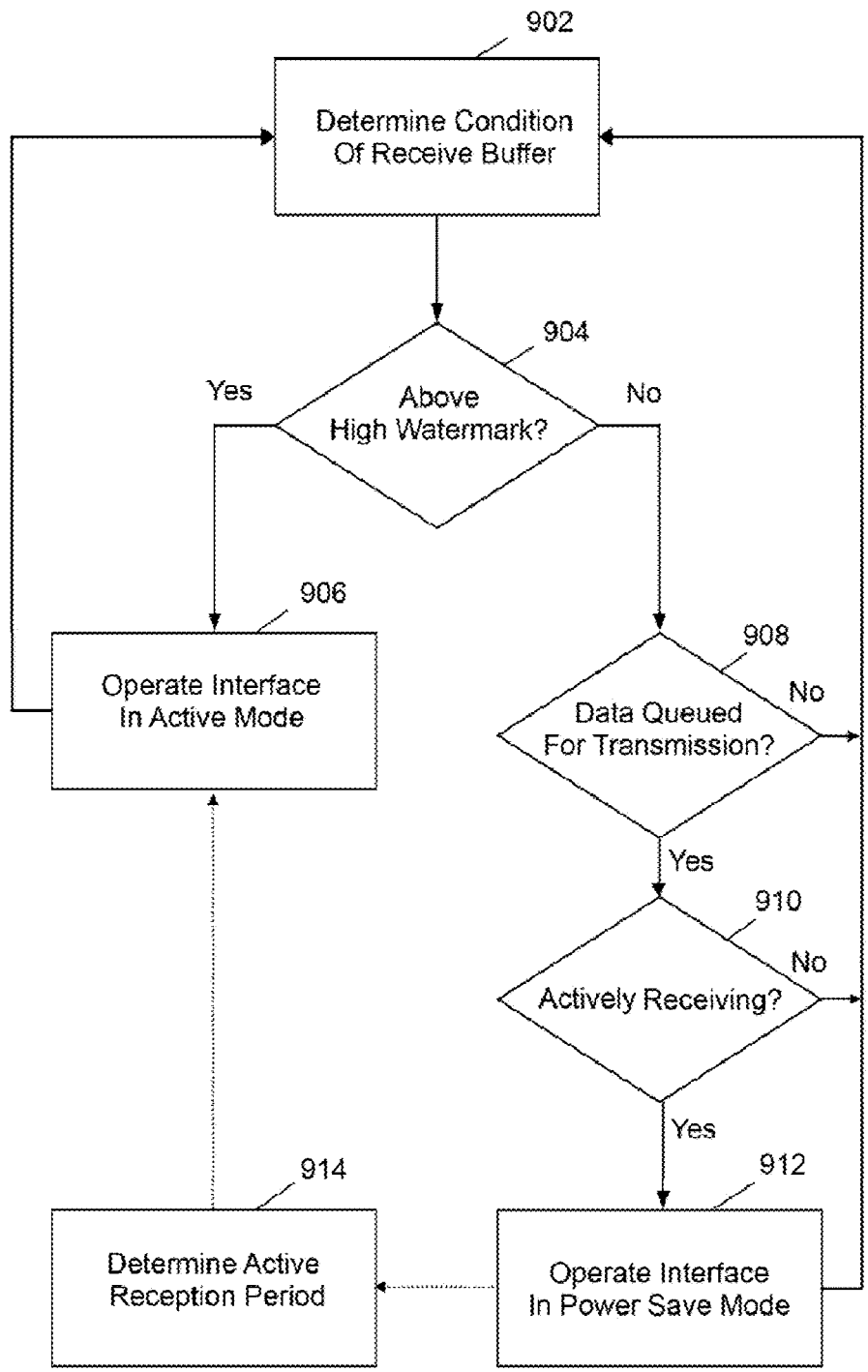
FIG. 9 is a flowchart representing another routine for controlling the link state of an interface using a receive buffer condition of a transceiver, according to one embodiment.
Figure 10:
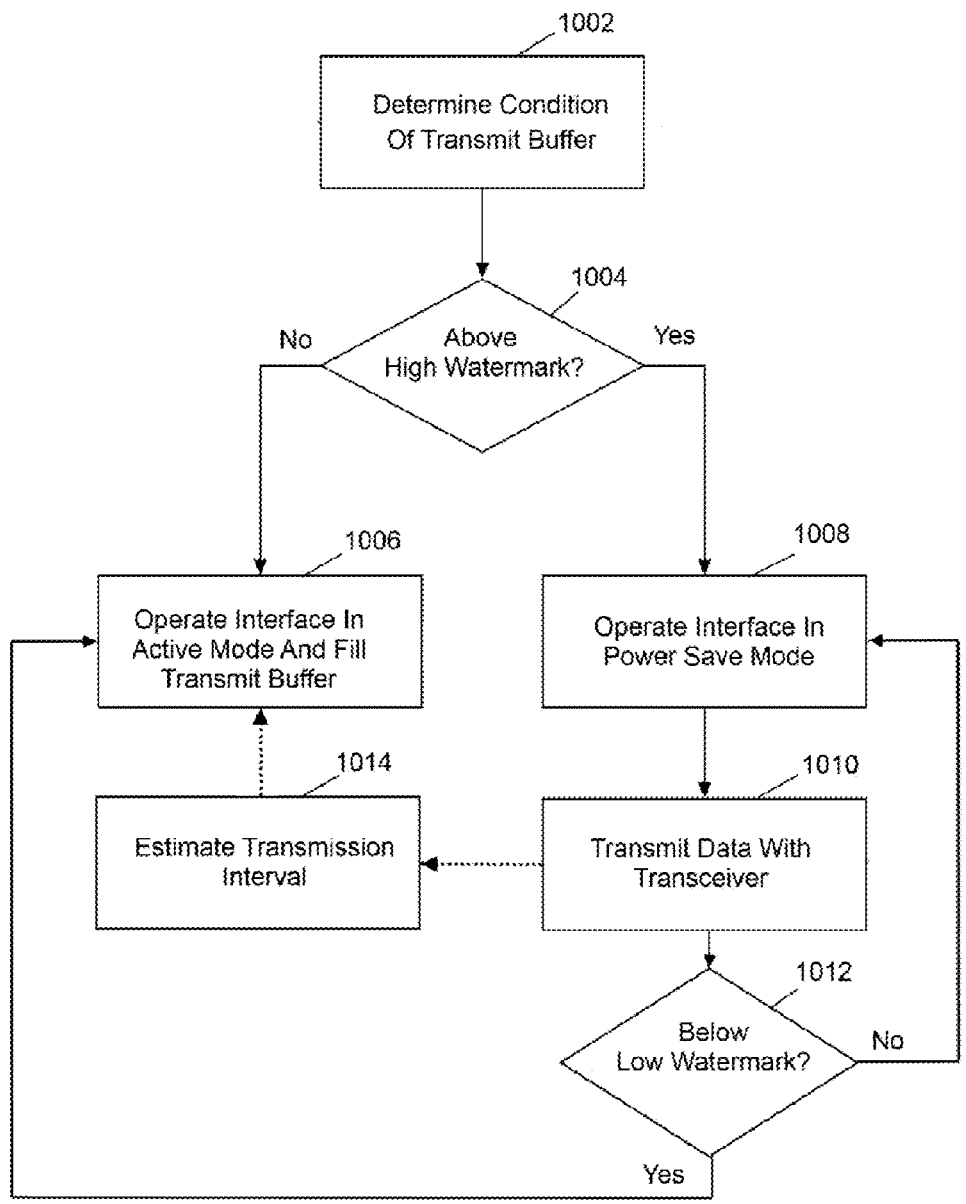
FIG. 10 is a flowchart representing a routine for controlling the link state of an interface using a transmit buffer condition of a transceiver, according to one embodiment.

To help illustrate the techniques of the disclosure described above, exemplary routines for operating an interface, such as PCIe link 114 in an active mode and a power save mode depending upon a condition of a buffer implemented in the local memory of a data exchange module, such as WLAN module 108, are represented by the flowcharts shown in FIGS. 8-10.

First, FIG. 8 illustrates a routine for operating the link state of an interface depending upon a condition of a receive buffer, co-located with WLAN module 108 or otherwise implemented as local memory. When WLAN module 108 is in a receive state, link manager 112 may determine a condition of the receive buffer as indicated in 802. In 804, if the amount of data in the buffer is above a high watermark, link state machine 116 may operate PCIe link 114 in the active mode in 806. When in active mode, the routine may return to 802 to monitor the condition of the receive buffer for changes. Alternatively, if the amount of data is below the high watermark, link state machine 116 may operate PCIe link 114 in the power save mode in 808. In one embodiment, the routine may progress to 810 to determine if a reception interval has lapsed. If not, the routine may return to 808 to maintain PCIe link 114 in the power save mode. Otherwise, if the reception interval has lapsed, link manager 112 may switch PCIe link 114 to the active mode. Optionally, as indicated by 812, the receive buffer may be flushed by transferring any data to the remote memory after transitioning to active mode, before the receive buffer has been refilled to the high watermark. In another embodiment, as indicated by the dashed path from 808, the routine may return to 802 to monitor the condition of the receive buffer while PCIe link 114 is in the power save mode, such that PCIe link 114 may be returned to the active mode when the receive buffer reaches the high watermark. Although not shown, the receive buffer may be flushed upon return to the active mode in this embodiment as well.

Next, FIG. 9 illustrates another routine for operating the link state of an interface depending upon a condition of a receive buffer. Similarly, link manager 112 may determine a condition of the receive buffer in 902 and as indicated by 904, if the amount of data in the buffer is above a high watermark, link state machine 116 may operate PCIe link 114 in the active mode in 906. If the amount of data is below the high watermark, link manager 116 may confirm other conditions or states of WLAN module 108 before link state machine 116 transitions PCIe link 114 to the power save mode in 808. In 908, link manager 112 may determine whether WLAN module 108 has data queued for transmission. If not, the routine may return to the start. Otherwise, link manager 112 may determine whether WLAN module 108 is actively receiving data in 910. If not, the routine may return to start. Otherwise, when the conditions of 908 and 910 are met, link manager 112 may operate PCIe link 114 in the power save mode. In one embodiment, the routine may progress to 902 to monitor the condition of the receive buffer. In another embodiment, as indicated by the dashed path to 914, link manager 112 may determine a period of time associated with WLAN module 108 actively receiving data. Link manager 112 may then coordinate a return to operation of PCIe link 114 in the active mode using the determined active reception period.

Next, the routine shown in FIG. 10 represents operating the link state of an interface depending upon a condition of a transmit buffer. Beginning with 1002, link manager 112 may determine a condition of the transmit buffer when WLAN module 108 is in a state of having a pending transmission. As indicated by 1004, if the amount of data in the buffer, co-located with WLAN module 108 or otherwise implemented as local memory, is below a high watermark, link state machine 116 may operate PCIe link 114 in the active mode in 1006 and continue to fill the transmit buffer. When in active mode, the routine may return to 1002 to monitor the condition of the receive buffer for changes. Alternatively, if the amount of data is above the high watermark, link state machine 116 may operate PCIe link 114 in the power save mode in 1008. From this mode, WLAN module 108 may transmit data held in the transmit buffer as indicated by 1010. In one embodiment, the routine may progress to 1012 to determine if the amount of data in the transmit buffer has fallen below a low watermark. If so, the routine may flow to 1006 and link manager link manager 112 may switch PCIe link 114 to the active mode. If not, the routine may return to 1008 and PCIe link 114 may be maintained in the power save mode. In another embodiment, as indicated by the dashed path to 1014, link manager 112 may estimate a period of time necessary to transmit an amount of data in the transmit buffer. Correspondingly, link manager 112 may then coordinate a return to operation of PCIe link 114 in the active mode in 1006 using the estimated transmission interval.

Described herein are exemplary embodiments. However, one skilled in the art that pertains to the present disclosure will understand that the principles of this disclosure can be extended easily with appropriate modification. For example, although the above embodiments have been described primarily in the context of a PCIe interface employed in a WLAN wireless communications device, one of skill in the art will recognize that other suitable interfaces and wireless protocols may be used as desired. In a further example, any of the above parameters may be adjusted to tune the performance of embodiments of the disclosure to a desired level. Additionally, the techniques of this disclosure are not limited to a transceiver, but may be applied to any data exchange module having local memory and remote memory accessed over an interface capable of operating in at least an active mode and a power save mode.

What is claimed is:

1. A wireless communications device, comprising:
    a transceiver, including a receive chain and a transmit chain, wherein the receive chain and the transmit chain are separate and implemented internally in the transceiver;
    an interface, wherein the interface receives output from the receive chain and provides output to the transmit chain;
    a local memory available to the transceiver, wherein the local memory is not communicably coupled to the transceiver through the interface;
    a remote memory communicably coupled to the transceiver through the interface;
    a buffer implemented in the local memory; and
    a link manager, wherein the link manager is configured to operate the interface in at least an active mode and a power save mode based, at least in part, on a condition of the buffer and a state of the transceiver;
    wherein the buffer is at least one of:
    a receive buffer such that the link manager is further to operate the interface in the power save mode when data in the receive buffer is below a high watermark and to operate the interface in the active mode when data in the receive buffer is above the high watermark; and
    a transmit buffer implemented in the local memory such that the link manager is to operate the interface in the active mode when data in the transmit buffer is below a high watermark and to operate the interface in the power save mode when data in the transmit buffer is above the high watermark.

2. The wireless communications device of claim 1, wherein the link manager further to operate the interface in the active mode when a reception interval lapses.

3. The wireless communications device of claim 2, wherein the link manager further to operate the interface in the active mode when the reception interval lapses only while receiving data having a first traffic class.

4. The wireless communications device of claim 1, wherein the link manager further to transfer data from the receive buffer to the remote memory when switching the interface from the power save mode to the active mode prior to data in the receive buffer being above the high watermark.

5. The wireless communications device of claim 1, wherein the link manager further to switch the interface from the active mode to the power save mode when data in the receive buffer falls below a programmable low watermark.

6. The wireless communications device of claim 5, wherein the programmable low watermark is set to zero.

7. The wireless communications device of claim 1, wherein the link manager further to operate the interface in the power save mode when data is queued for transmission while the transceiver is actively receiving and the data in the receive buffer is below the high watermark.

8. The wireless communications device of claim 7, wherein the link manager further to determine a period of time corresponding to when the transceiver is actively receiving and to coordinate a switch from the power save mode to the active mode based, at least in part, on the period of time in preparation for transmission of the queued data.

9. The wireless communications device of claim 1, wherein the transceiver further to transmit data from the transmit buffer when the interface is in power save mode and the data in the transmit buffer is above the high watermark.

10. The wireless communications device of claim 1, wherein the link manager further to switch the interface from the power save mode to the active mode when data in the transmit buffer falls below a low watermark.

11. The wireless communications device of claim 1, wherein the link manager further to estimate a period of time required to transmit data in the transmit buffer and to switch the interface from the power save mode to the active mode based, at least in part, on the period of time.

12. The wireless communications device of claim 11, wherein the link manager to estimate the period of time based, at least in part, on a transmit data rate.

13. The wireless communications device of claim 12, wherein the link manager to estimate the period of time further based, at least in part, on a recent channel metric.

14. The wireless communications device of claim 13, wherein the recent channel metric is at least one of the group consisting of on-air collision rate and a clear channel assessment report.

15. The wireless communications device of claim 1, wherein the link manager to operate the interface in the power save mode for at least a configurable portion of a back off period when information is queued for transmission.

16. The wireless communications device of claim 1, wherein the link manager to maintain an operational state of the interface when a number of switches between the active mode and the power save mode by the interface over a defined period of time is above a predetermined threshold.

17. A method for operating a wireless communications device, wherein the wireless communications device includes a transceiver, including a receive chain and a transmit chain, wherein the receive chain and the transmit chain are separate and implemented internally in the transceiver, an interface, wherein the interface receives output from the receive chain and provides output to the transmit chain, a local memory available to the transceiver, wherein the local memory is not communicably coupled to the transceiver through the interface, a remote memory communicably coupled to the transceiver through the interface, and a buffer implemented in the local memory, comprising:
    operating the interface in at least an active mode and a power save mode based, at least in part, on a condition of the buffer and a state of the transceiver;
    wherein when the buffer is a receive buffer, operating the interface comprises operating the interface in the power save mode when data in the receive buffer is below a high watermark and operating the interface in the active mode when data in the receive buffer is above the high threshold and when buffer is a transmit buffer, operating the interface comprises operating the interface in the active mode when data in the transmit buffer is below a high watermark and operating the interface in the power save mode when data in the transmit buffer is above the high watermark.

18. The method of claim 17, wherein operating the interface comprises operating the interface in the active mode when a reception interval lapses.

19. The method of claim 18, wherein operating the interface comprises operating the interface in the active mode when the reception interval lapses only while receiving data having a first traffic class.

20. The method of claim 17, further comprising transferring data from the receive buffer to the remote memory when switching the interface from the power save mode to the active mode prior to data in the receive buffer being above the high watermark.

21. The method of claim 17, wherein operating the interface further comprises switching the interface from the active mode to the power save mode when data in the receive buffer falls below a programmable low watermark.

22. The method of claim 21, wherein the programmable low watermark is set to zero.

23. The method of claim 17, further comprising operating the interface in the power save mode when data is queued for transmission while the transceiver is actively receiving and data in the receive buffer is below the high watermark.

24. The method of claim 23, further comprising determining a period of time corresponding to when the transceiver is actively receiving and coordinating a switch from the power save mode to the active mode based, at least in part, on the period of time in preparation for transmission of the queued data.

25. The method of claim 17, further comprising transmitting data from the transmit buffer when the interface is in power save mode and the data in the transmit buffer is above the high watermark.

26. The method of claim 17, wherein operating the interface further comprises switching the interface from the power save mode to the active mode when data in the transmit buffer falls below a low watermark.

27. The method of claim 17, further comprising estimating a period of time required to transmit data in the transmit buffer, wherein operating the interface further comprises switching the interface from the power save mode to the active mode based, at least in part, on the period of time.

28. The method of claim 27, wherein estimating the period of time comprises estimating the period of time based, at least in part, on a transmit data rate.

29. The method of claim 28, wherein estimating the period of time comprises estimating the period of time further based, at least in part, on recent channel metrics.

30. The method of claim 29, wherein the recent channel metric is at least one of the group consisting of on-air collision rate and a clear channel assessment report.

31. The method of claim 17, further comprising operating the interface in the power save mode for at least a portion of a back off period when information is queued for transmission.

32. The method of claim 17, further comprising maintaining an operational state of the interface if a number of switches between the active mode and the power save mode by the interface over a defined period of time is above a predetermined threshold.

33. A non-transitory process-readable storage medium for operating a wireless communications device, wherein the wireless communications device includes a transceiver, including a receive chain and a transmit chain, wherein the receive chain and the transmit chain are separate and implemented internally in the transceiver, an interface, wherein the interface receives output from the receive chain and provides output to the transmit chain, a local memory available to the transceiver, wherein the local memory is not communicably coupled to the transceiver through the interface, a remote memory communicably coupled to the transceiver through the interface, and a buffer implemented in the local memory, the processor-readable storage medium having instructions thereon, when executed by a processor to cause the wireless communications device to:

operate the interface in at least an active mode and a power save mode based, at least in part, on a condition of the buffer and a state of the transceiver:

wherein when the buffer is a receive buffer, the instructions to operate the interface comprise instructions to operate the interface in the power save mode when data in the receive buffer is below a high watermark and to operate the interface in the active mode when data in the receive buffer is above the high threshold and when buffer is a transmit buffer, the instructions for operating the interface comprise instructions to operate the interface in the active mode when data in the transmit buffer is below a high watermark and operating the interface in the power save mode when data in the transmit buffer is above the high watermark.

34. The storage medium of claim 33, further comprising instructions to cause the wireless communications device to transfer data from the receive buffer to the remote memory when switching the interface from the power save mode to the active mode prior to data in the receive buffer being above the high watermark.

35. The storage medium of claim 33, wherein the instructions to operate the interface comprise instructions to switch the interface from the active mode to the power save mode when data in the receive buffer falls below a programmable low watermark.

36. The storage medium of claim 33, further comprising instructions to operate the interface in the power save mode when data is queued for transmission while the transceiver is actively receiving and data in the receive buffer is below the high watermark.

37. The storage medium of claim 35, further comprising instructions to determine a period of time corresponding to when the transceiver is actively receiving and to coordinate a switch from the power save mode to the active mode based, at least in part, on the period of time in preparation for transmission of the queued data.

38. The storage medium of claim 33, further comprising instructions to transmit data from the transmit buffer when the interface is in power save mode and the data in the transmit buffer is above the high watermark.

39. The storage medium of claim 33, wherein the instructions to operate the interface comprise instructions to switch the interface from the power save mode to the active mode when data in the transmit buffer falls below a low watermark.

40. The storage medium of claim 33, further comprising instructions to estimate a period of time required to transmit data in the transmit buffer, wherein the instructions to operate the interface comprise instructions to switch the interface from the power save mode to the active mode based, at least in part, on the period of time.

41. The storage medium of claim 40, wherein the instructions to estimate the period of time comprise instructions to estimate the period of time based, at least in part, on a transmit data rate.

42. The storage medium of claim 41, wherein the instructions to estimate the period of time comprise instructions to estimate the period of time further based, at least in part, on recent channel metrics.

43. The storage medium of claim 33, further comprising instructions to operate the interface in the power save mode for at least a portion of a back off period when information is queued for transmission.

44. The storage medium of claim 33, further comprising instructions to maintain an operational state of the interface if a number of switches between the active mode and the power save mode by the interface over a defined period of time is above a predetermined threshold.

* * * * *